US006863433B2

(12) United States Patent
Knight

(10) Patent No.: US 6,863,433 B2
(45) Date of Patent: Mar. 8, 2005

(54) AUGER WITH FORWARD ANGLED LEADING EDGE

(75) Inventor: William S. Knight, Brodhead, WI (US)

(73) Assignee: Kuhn Knight Inc., Brodhead, WI (US)

( * ) Notice: Subject to any disclaimer, the term of this patent is extended or adjusted under 35 U.S.C. 154(b) by 105 days.

(21) Appl. No.: 10/453,602

(22) Filed: Jun. 4, 2003

(65) Prior Publication Data

US 2003/0223308 A1 Dec. 4, 2003

Related U.S. Application Data

(60) Provisional application No. 60/385,510, filed on Jun. 4, 2002, and provisional application No. 60/385,628, filed on Jun. 4, 2002.

(51) Int. Cl.[7] ............................... B01F 7/24; B02C 9/02
(52) U.S. Cl. ................ 366/314; 366/318; 241/101.761; 241/260.1
(58) Field of Search ................................ 366/314, 318, 366/319, 323, 324; 241/101.761, 260.1, 46.017

(56) References Cited

U.S. PATENT DOCUMENTS

| 450,237 A | 4/1891 | Kam |
|---|---|---|
| 2,542,587 A | 2/1951 | Smith |
| 3,129,927 A | 4/1964 | Mast |
| 4,432,499 A | 2/1984 | Henkensiefken et al. |
| 5,240,321 A | 8/1993 | Miller |
| 5,456,416 A | 10/1995 | Hartwig |
| 5,601,362 A | 2/1997 | Schuler |
| 5,615,839 A | 4/1997 | Hartwig |
| 5,647,665 A | 7/1997 | Schuler |
| 5,803,375 A | 9/1998 | Hartwig |
| 5,823,449 A | 10/1998 | Kooima et al. |
| 5,863,122 A | 1/1999 | Tamminga |
| 6,328,465 B1 | 12/2001 | Tamminga |
| 6,409,377 B1 | 6/2002 | Van Der Plas |
| 2001/0038573 A1 | 11/2001 | Knight |

FOREIGN PATENT DOCUMENTS

| DE | 29801088 U1 | 4/1998 |
|---|---|---|
| DE | 19829867 A1 | 1/2000 |
| DE | 10245001 A1 | 4/2003 |
| WO | 03/009929 A2 | 2/2003 |

*Primary Examiner*—Tony G. Soohoo
(74) *Attorney, Agent, or Firm*—Oblon, Spivak, McClelland, Maier & Neustadt, P.C.

(57) ABSTRACT

An auger for vertical mixers includes a forward angled leading edge. The leading edge includes an inner portion, which may or may not be aligned with a radial line extending from the axis of rotation of the auger. The leading edge also includes an outer portion adjacent to the inner portion, which is angled forward of the radial line and extends forward of the inner portion.

14 Claims, 4 Drawing Sheets

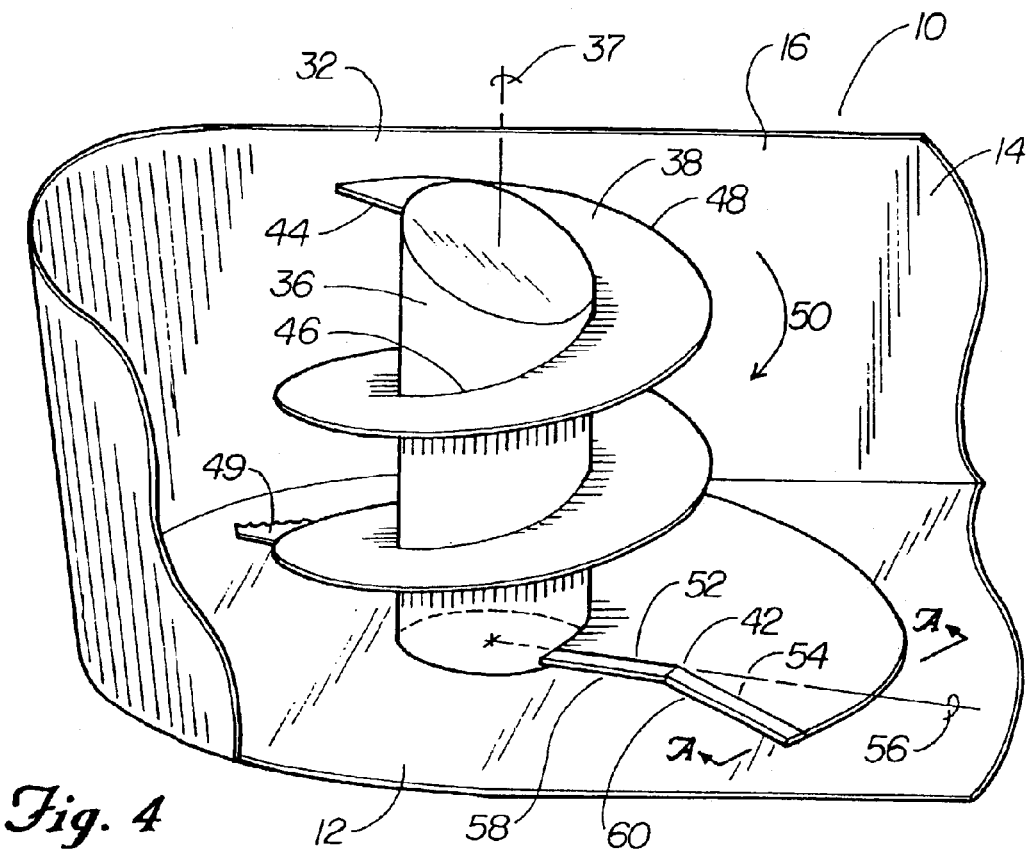
Fig. 4
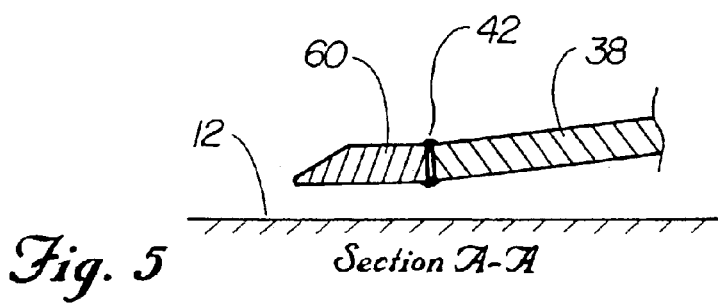
Fig. 5    Section A-A

AUGER WITH FORWARD ANGLED LEADING EDGE

CROSS-REFERENCE TO RELATED APPLICATIONS

This application is related to and claims the benefit of U.S. provisional application Ser. No. 60/385,510, filed Jun. 4, 2002. This application is also related to co-pending U.S. application Ser. No. 10/453,604, entitled "Mixer with Dissimilar Augers", filed on even date herewith, and U.S. provisional application Ser. No. 60/385,628, filed Jun. 4, 2002. The contents of those three applications are incorporated herein by reference in their entirety.

BACKGROUND OF THE INVENTION

Field of the Invention

This invention relates generally to vertical augers, and in one embodiment this invention pertains to vertical augers used in agricultural mixers.

DISCUSSION OF THE BACKGROUND

Agricultural mixers are used for mixing feed materials such as hay, silage and other nutrients including animal feed supplements and grains. These feed materials are then discharged and fed to various livestock such as cattle and dairy cows. Sometimes the mixing of such feed materials includes depositing a whole round or square bale of hay into the mixer. The mixer then cuts and processes the bale into the desired consistency before and during the mixing of the other feed nutrients.

In known mixers, there are many different configurations including horizontal augers, reel-type arrangements, and vertical augers. In the vertical auger type mixers, the auger designs are often very similar. The auger generally consists of a center core on a vertical axis, with helical auger flighting wrapped around this core. The auger flighting has an overall conical appearance, being wider at the base and narrower at the top. The wide leading edge of the flighting at the bottom of the mixer is made to travel close to the flat floor of the mixer, scooping or peeling the material upwards onto the flighting. Often, a hardened bar (e.g., a grader blade) is added to the leading edge to increase the durability of the auger.

The leading edge of a typical vertical auger flighting is generally oriented on a radial line from the center of the vertical axis, perpendicular to the direction of rotation. The main reason for this straight leading edge design is because of the way the flighting is manufactured. The flighting starts as a flat circular plate with a single cut from the center to the edge. When this flat plate is formed into a helical flight, the leading edge remains a straight line from the center axis. It is easy to add the grader bar to this straight leading edge to complete the auger assembly.

A disadvantage of the straight leading edge design is that it tends to push or plow materials rather than scooping the material on top of itself. The tendency is particularly evident in longer length hay or sticky materials, which can wrap around or build up on the leading edge. This resulting plowing action requires higher horsepower, and limits the mixing ability and processing speed of the mixer.

SUMMARY OF THE INVENTION

Accordingly, it is, therefore, desirable to have an improved design for augers that can reduce these wrap-around and build-up problems in order to reduce the energy consumption and to increase the productivity of agricultural mixers and other similar devices.

Thus, one of the objectives of the present invention is to provide a vertical mixer auger with a forward leading edge, which overcomes the problems associated with prior art devices and makes a considerable contribution to the art of mixing feed materials. Depending on the embodiment of the present invention, other advantages include, for example:

(a) providing a leading edge that creates a wedge effect while in rotary motion, allowing it to more easily move through feed materials;

(b) providing a leading edge that reduces the horsepower required to mix feed materials;

(c) providing a leading edge that tends to cut or slice material with a longer slanted edge rather than pushing material with a shorter straight edge;

(d) providing a leading edge that improves the sweeping action at the floor of the mixer; and (e) providing a leading edge that is more durable and efficient in use.

In accordance with one embodiment of the present invention, an auger for vertical mixers comprising a forward angled leading edge is disclosed. An agricultural mixer for mixing hay or silage with other nutrients is also disclosed, comprising a frame, a mixing chamber having a floor and a sidewall, and at least one vertical auger comprising a forward angled leading edge being mounted within the mixing chamber. This vertical auger further comprises a core, and a helical flighting secured to and disposed coaxially with the core. The leading edge of the helical flighting has an inner and an outer portion, wherein the outer portion of this leading edge extends ahead of the inner portion of the leading edge with respect to the direction of rotation of the auger.

BRIEF DESCRIPTION OF THE DRAWINGS

These and other advantages of the invention will become more apparent and more readily appreciated from the following detailed description of the exemplary embodiments of the invention taken in conjunction with the accompanying drawings, where:

FIG. 4 is a cutaway perspective view of the vertical mixer auger shown in FIG. 1;

FIG. 5 is a cross-section of the leading edge shown in FIG. 4 taken along line A—A of FIG. 4;

DETAILED DESCRIPTION OF THE INVENTION

Figure 1:
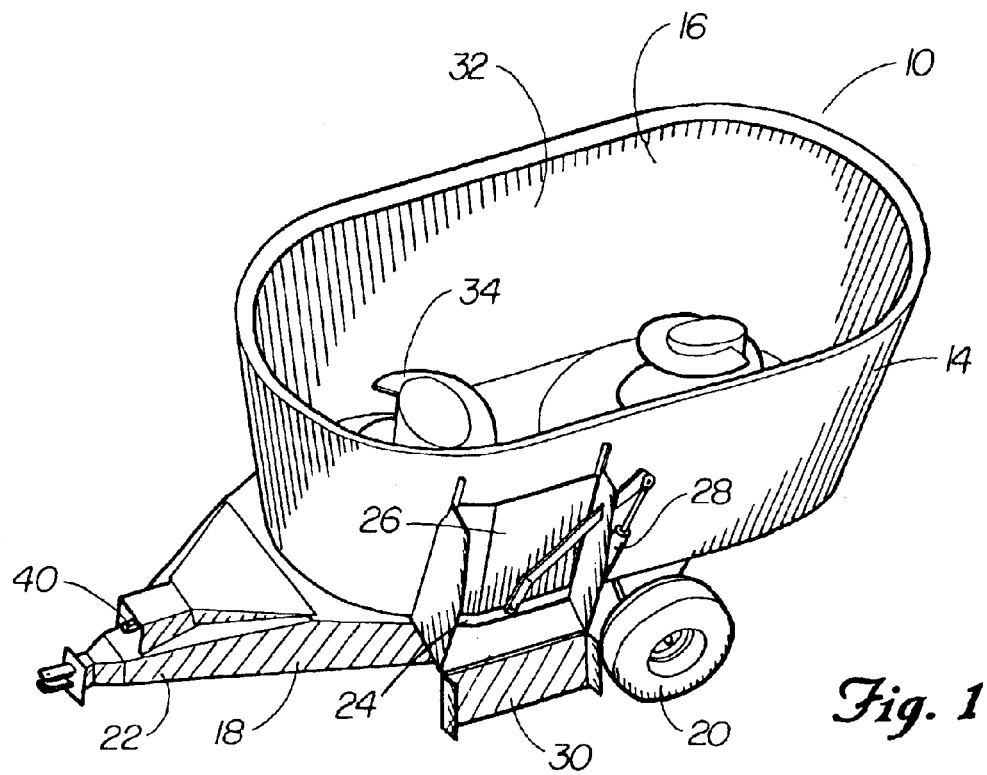
FIG. 1 is perspective view of a vertical feed mixer.
Figure 2:
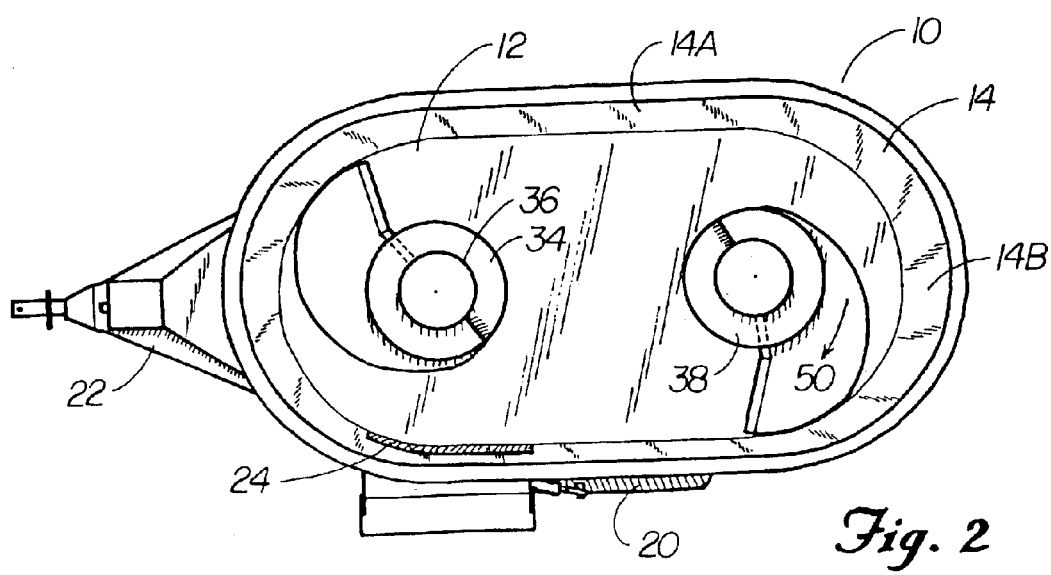
FIG. 2 is a top view of the vertical mixer shown in FIG. 1.
Figure 3:
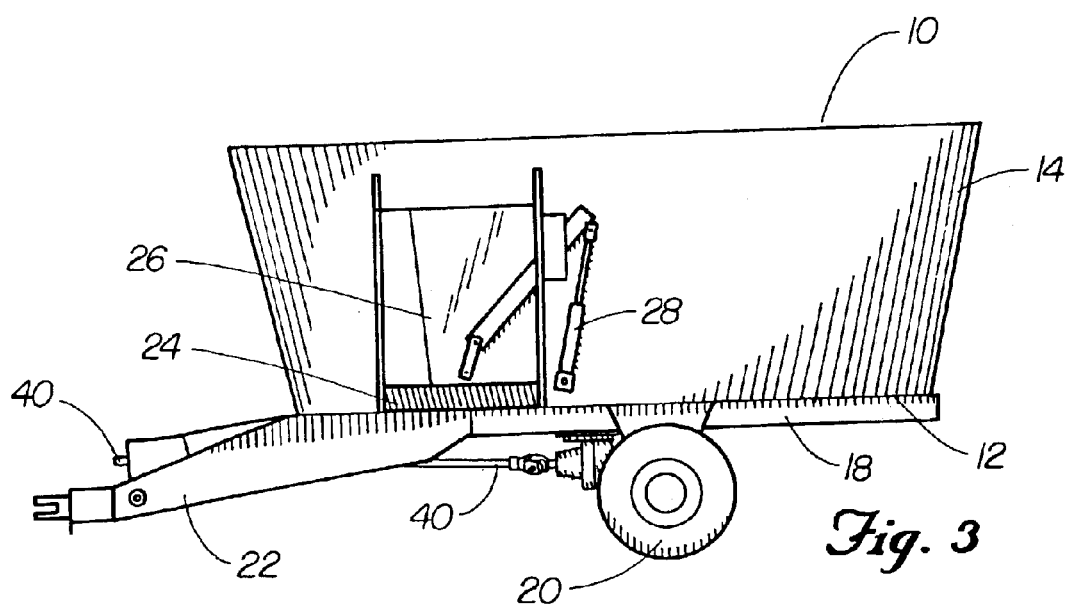
FIG. 3 is a side view of the vertical mixer shown in FIG. 1.

With reference to the drawings, a vertical feed mixer is generally designated by the reference number 10. As illustrated in FIGS. 1–3, the mixer includes a floor 12, a sidewall 14, and an open upper end 16. The mixer is mounted upon a frame 18, including wheels 20. A tongue 22 extending from the frame 18 is adapted to be hitched to a tractor or other prime mover. The sidewall 14 includes a discharge opening 24 with a discharge door 26 movable between open and closed positions by a hydraulic cylinder 28. A discharge chute 30 extends outwardly adjacent to the discharge opening 24.

The floor 12 and the sidewall 14 define a mixing chamber 32. An auger 34 is rotatably mounted within the mixing chamber 32, and includes a vertically disposed core 36. As illustrated, the mixing chamber 32 may also include two or more augers 34. The core 36 and the auger 34 rotate around an axis of rotation 37, as shown in FIG. 4. A helical flighting 38 is secured to and disposed coaxially with the core 36. A driveline 40 for rotating the auger 34 is operatively connected to the power takeoff of the tractor. The sidewall 14 is oval or oblong at the top edge of the mixer 10, as shown in FIG. 2. Thus, the sides 14A of the sidewall 14 are closer to the auger 34 than are the ends 14B of the sidewall 14.

As shown in FIG. 4, the helical flighting 38 has a leading edge 42 and a trailing edge 44. The leading edge 42 is adjacent to the floor 12 during normal operation. The helical flighting also has an inside edge 46 which is secured to the core 36, and an outside edge 48. The outside edge 48 often has knives 49 attached, which facilitates the cutting of materials placed inside the mixing chamber 32. The auger 34 rotates in a direction of rotation 50 around the axis of rotation 37. The design of the mixing chamber 32, as well as other features of the present invention, can be, but is not limited to being, implemented similarly to the corresponding component of the Verti-Maxx vertical auger of Kuhn-Knight Inc.

The leading edge 42 of the helical flighting 38 has an inner portion 52 and an outer portion 54. The inner portion 52 of the leading edge 42 is adjacent to the core 36, and is normally parallel with a radial line 56 extending from the axis of rotation 37. The outer portion 54 of the leading edge 42 is adjacent to the inner portion 52, and and slants forward of the inner portion 52 in the direction of rotation 50. In a preferred embodiment, the angle of the outer portion 54 to the inner portion 52 is approximately 140 degrees, however an angle range from 90 degrees to 175 degrees could be utilized. Specific sub-ranges contemplated for use with the present invention include 130–150 degrees, and more generally 120–160 degrees.

Beveled grader bars made of hardened or abrasion-resistant steel are sometimes welded or bolted to the leading edge 42 to increase the durability of the leading edge 42. An inner grader bar 58 is attached to the inner portion 52 of the leading edge 42. An outer grader bar 60 is attached to the outer portion 54 of the leading edge 42. FIG. 5 shows a cross section of the attachment between the leading edge 42 of the flighting 38 and the outer grader bar 60 taken along line A—A of FIG. 4.

Figure 6:
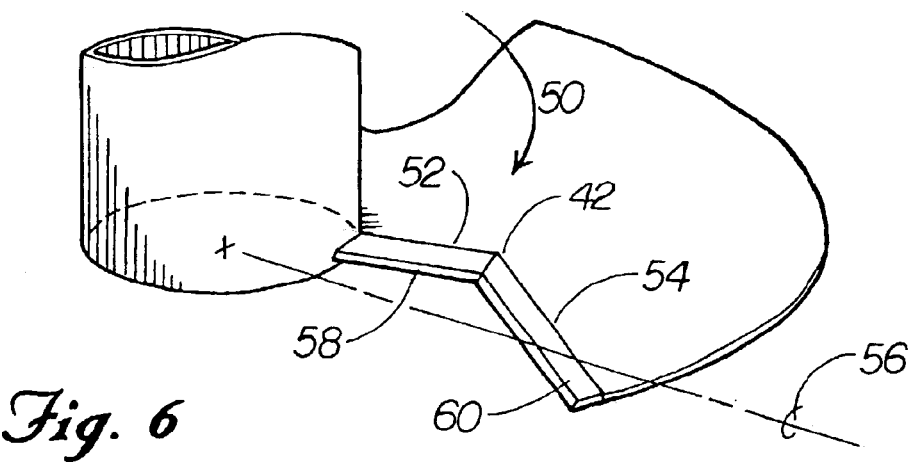
FIG. 6 is a perspective view exemplifying another embodiment of the leading edge of the present invention.

FIG. 6 shows an alternative embodiment of the forward angled leading edge. In this configuration, the inner portion 52 of the leading edge 42 is not parallel to the radial line 56, but slants backward therefrom with respect to the direction of rotation 50, while the outer portion 54 of the leading edge 42 slants forward with respect to the inner portion 52 of the leading edge 42.

Figure 7:
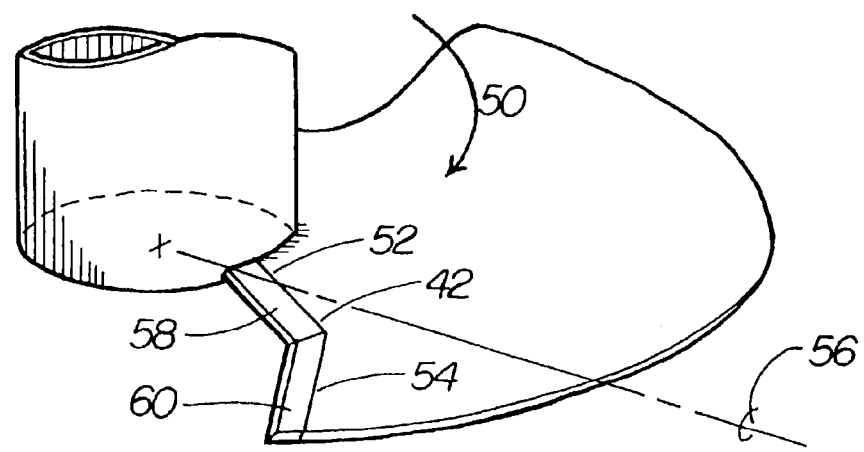
FIG. 7 is a perspective view exemplifying yet another embodiment of the leading edge of the present invention.

FIG. 7 shows yet another alternative embodiment of the forward angled leading edge. In this configuration, the inner portion 52 of the leading edge 42 is also not parallel to the radial line 56, but slants forward therefrom, while the outer portion 54 of the leading edge 42 is further slanted forward to respect to the inner portion 52 of the leading edge 42.

The inner portion 52 and the outer portion 54 may also be separated by a number of intermediate portions (not shown). For example, a first intermediate portion angled forward of the inner portion 52, but not angled as far forward as the outer portion 54, may also be used. Alternatively, the inner portion 52 and the outer portion 54 may be repeated a number of times to form a saw-toothed configuration.

The inner portion 52 and the outer portion 54 also need not be linear. That is, the inner portion 52 may be curved and may even be curved all the way to the outer portion 54 (which itself may be curved).

Operation

In operation, the operator attaches a tractor or other power source to the driveline 40 using a telescoping PTO (not shown) to transmit rotational power to the mixer 10. The hay or other long stemmed forages in the form of large round or square bales are added into the mixing chamber 32 while the auger 34 is rotating. Some mixers 10 utilize a larger mixing chamber 32 with multiple augers 34. The knives 49 on the auger(s) 34 cooperate with the sidewall 14 to cut the bulky hay into shorter lengths for feeding to the livestock. Additional feed materials, including grains, silage, and other feed supplements, are then added into the mixing chamber 32 and mixed with the hay. Due to the oblong shape of the mixing chamber 32, the hay and other feed material tend to migrate downward toward the ends 14B of the sidewall 14 and upward adjacent the opposite sides 14A of the mixing chamber 32. This upward and downward flow of the hay and other feed material, together with the rotation of the auger(s) provides a thorough mixing action. During this mixing action, the discharge door 26 is closed so that no feed material is discharged through the discharge opening 24.

As shown in FIG. 4, the auger 34 rotates around the axis of rotation 37 in the direction of rotation 50; the leading edge 42 and grader bars 58 and 60 travel adjacent to the floor 12 directing material onto the flighting 38. The feed materials travel upward along the top face of the flighting 38 until they cascade off the trailing edge 44 or outside edge 48. The materials then settle downward until the flighting 38 can again engage them. The forward leading angle of the outer portion 58 of the leading edge 42 forms a pointed wedge shape, which can more easily move through the feed materials. Compared to prior-art auger designs, the close proximity of the leading edge 42 and inner and outer grader bars 58 and 60 to the floor 12 help to reduce the horsepower required to rotate the auger(s) 34 and minimize the material remaining on the floor 12 after mixing and discharge is complete.

At the completion of the mixing operation, the hydraulic cylinder 28 is actuated to open the door 26 so that feed materials can be discharged out of the discharge opening 24. The centrifugal effect caused by the rotation of auger(s) 34 helps to push the feed materials out of the discharge opening 24 and onto the discharge chute 30 for delivery to the livestock feeding bunk or trough (not shown). The speed of the rotating auger(s) 34 is normally around 24–30 revolutions per minute, but can be increased at the end of the load to increase the discharge of the feed materials.

Accordingly, the vertical mixer with a forward angled leading edge creates a wedge effect while in rotary motion, allowing it to more easily move through the feed materials. This feature lowers the horsepower required for the mixing, especially during the startup of the augers. The forward angled leading edge also tends to cut or slice material with the longer slanted edge rather than pushing or plowing them with a shorter straight edge, and thus requires less horsepower. The forward angled leading edge also improves the sweeping action at the floor, while providing a stronger leading edge, which is more durable and efficient in use.

Although the description above contains many specifics, these should not be construed as limiting the scope of the invention, but as merely providing illustrations of some of the presently preferred embodiments of this invention. Thus the scope of the invention should be determined by the appended claims and their legal equivalents, rather than by the examples given.

What is claimed is:

1. An auger for a vertical mixer having an axis and a direction of rotation, said auger comprising:
   a core; and
   a helical flighting secured to and disposed coaxially with said core, said helical flighting having a leading and a trailing edge and said leading edge having an inner and an outer portion, wherein
   said outer portion extends ahead of said inner portion with respect to a radial line
   perpendicular to and extending from said axis of rotation.

2. The auger of claim 1, wherein a grader bar is attached to each of said inner and outer portions.

3. The auger of claim 1, wherein said inner portion is approximately parallel to said radial line.

4. The auger of claim 1, wherein said inner portion slants backward from said radial line with respect to said direction of rotation.

5. The auger of claim 1, wherein said inner portion slants forward from said radial line with respect to said direction of rotation.

6. The auger of claim 1, wherein the angle between said inner and said outer portions ranges from about 120 to 160 degrees.

7. The auger of claim 6, wherein the angle between said inner and said outer portions is approximately 140 degrees.

8. An auger for a vertical mixer having an axis and a direction of rotation, said auger comprising:
   a core; and
   a helical flighting secured to and disposed coaxially with said core, said helical
   flighting having a leading and a trailing edge and
   said leading edge having an inner and an outer portion,
   said outer portion is disposed at an angle forward of said inner portion.

9. The auger of claim 8, wherein a grader bar is attached to each of said inner and outer portions.

10. An auger for a vertical mixer having an axis and a direction of rotation, said auger comprising:
    a core; and
    a helical flighting secured to and disposed coaxially with said core, said helical flighting having a leading and a trailing edge and
    said leading edge having an inner and an outer portion, wherein
    said outer portion is configured to form a wedge shaped point
    whereby said leading edge can more easily move through materials being mixed.

11. The auger of claim 10, wherein a grader bar is attached to each of said inner and outer portions.

12. An agricultural mixer for mixing hay or silage with other nutrients comprising:
    a frame;
    a mixing chamber having a floor and a sidewall; and
    at least one auger mounted within the mixing chamber, said auger comprising:
    a core;
    a helical flighting secured to and disposed coaxially with said core;
    said helical flighting having a leading and a trailing edge;
    said leading edge having an inner and an outer portion; and
    said outer portion extends ahead of said inner portion.

13. An agricultural mixer for mixing hay or silage with other nutrients comprising:
    a frame;
    a mixing chamber having a floor and a sidewall; and
    at least one auger mounted within the mixing chamber, said auger comprising:
    a core;
    a helical flighting secured to and disposed coaxially with said core;
    said helical flighting having a leading and a trailing edge;
    said leading edge having an inner and an outer portion; and
    said outer portion being disposed at an angle forward of said inner portion.

14. An agricultural mixer for mixing hay or silage with other nutrients comprising:
    a frame;
    a mixing chamber having a floor and a sidewall; and
    at least one auger mounted within the mixing chamber, said auger comprising:
    a core;
    a helical flighting secured to and disposed coaxially with said core;
    said helical flighting having a leading and a trailing edge;
    said leading edge having an inner and an outer portion; and
    said outer portion forming a wedge shaped point.

* * * * *